United States Patent [19]
Moore et al.

[11] Patent Number: 5,390,487
[45] Date of Patent: Feb. 21, 1995

[54] IGNITION SAFETY DEVICE FOR A ROCKET MOTOR

[75] Inventors: Kenneth L. Moore, Point-of-Rocks, Md.; James E. Goble, Bedford, Tex.; Philip B. Baldwin, Glendale, Ariz.

[73] Assignee: BEI Electronics, Inc., San Francisco, Calif.

[21] Appl. No.: 153,754

[22] Filed: Nov. 16, 1993

[51] Int. Cl.⁶ ............................................... F02K 9/08
[52] U.S. Cl. .................... 60/256; 60/39.823; 102/222
[58] Field of Search ............... 60/256, 39.091, 39.823; 102/221, 222, 254, 200, 202

[56] References Cited

U.S. PATENT DOCUMENTS

| | | | |
|---|---|---|---|
| 3,423,931 | 1/1969 | Schwarz et al. | 102/222 |
| 3,439,617 | 4/1969 | Boyd et al. | 102/554 |
| 3,529,418 | 9/1970 | Puckett et al. | 60/39.091 |
| 3,785,150 | 1/1974 | Katcher | 60/256 |
| 4,046,076 | 9/1977 | Hampton | 60/39.823 |
| 4,278,026 | 7/1981 | Hibbs et al. | 60/39.823 |
| 4,337,702 | 7/1982 | Betts | 60/256 |
| 4,346,658 | 8/1982 | Hibbs et al. | 60/39.823 |
| 4,483,250 | 11/1984 | Thurston et al. | 60/39.091 |
| 5,131,328 | 7/1992 | Chan | 102/254 |

FOREIGN PATENT DOCUMENTS

2584141  1/1987  France ................ 60/256

Primary Examiner—Timothy S. Thorpe
Attorney, Agent, or Firm—Palmatier & Zummer

[57] ABSTRACT

The ignition safety device is mounted on a rocket motor nozzle having a body with a longitudinal nozzle opening having an igniter therein for igniting the propulsion charge of the rocket motor. An electrically operable detonator is mounted in a detonator opening in a housing mounted in the body. An actuator and a locking member are movable in the body between safe and armed positions. The locking member has means operative in its safe position for locking the actuator. Movement of the locking member to its armed position unlocks the actuator. A spring biases the locking member to its safe position. The actuator is adapted to operate a switch which initially short circuits the electrically operable detonator but is operable by the actuator to an armed position in which the detonator is no longer short circuited and is connected to an electrical input circuit including a contact band on the nozzle body. The actuator also operates a gate between a safe position, in which the gate blocks any transmission of explosive energy between the detonator opening and an exit opening, and an armed position, in which the gate unblocks the exit opening for the transmission of explosive energy thereto. An explosive lead is connected between the exit opening and the igniter.

20 Claims, 6 Drawing Sheets

IGNITION SAFETY DEVICE FOR A ROCKET MOTOR

FIELD OF THE INVENTION

This invention relates to rocket motors for military rockets and pertains particularly to an ignition safety device for preventing inadvertent ignition of the rocket motor while providing for highly reliable ignition when desired.

BACKGROUND OF THE INVENTION

A military rocket motor generally includes a rocket nozzle having a longitudinal nozzle opening through which hot gases are copiously discharged at an extremely high velocity when the propellant charge in the rocket motor is ignited. The propellant charge may be ignited by an igniter mounted at either end of the propellant charge or in the entrance end of the nozzle opening. The igniter contains a small pyrotechnic charge capable of igniting the larger propellant charge.

Generally, an electrical initiator is employed to initiate combustion of the charge in the igniter. The initiator is triggered by an electrical current or signal from a selectively operable source associated with the rocket launcher into which the rocket is loaded.

OBJECTS OF THE INVENTION

One object of the present invention is to provide a new and improved ignition safety device which very effectively and reliably prevents inadvertent firing of the igniter, particularly when the rocket has not yet been loaded into the rocket launcher.

A further object is to provide a new and improved ignition safety device which is capable of igniting the igniter with an extremely high degree of reliability, when such ignition is desired, after the rocket has been loaded into the launcher and the ignition safety device has been set to its armed condition.

Another object of the present invention is to provide a new and improved ignition safety device having improved means for reliably preventing unwanted initiation of the electrical initiator therein, due to causes such as static electricity or a radar beam.

A further object is to provide a new and improved ignition safety device which will prevent initiation of the igniter, if the ignition safety device has not yet been armed, even though the electrical initiator is prematurely triggered.

Another object is to provide a new and improved ignition safety device having arming means constructed and arranged so that accidental arming of the safety device is extremely unlikely.

SUMMARY OF THE INVENTION

To accomplish these and other objects, the present invention preferably provides an ignition safety device for a rocket motor nozzle having a body with a longitudinal nozzle opening therein, comprising an igniter mounted in the nozzle opening and having a pyrotechnic igniter charge, a manually operable actuator movable in the body between safe and armed positions, a manually operable locking member movable in the body between safe and armed positions and having means for locking the actuator in its safe position when the locking member is in its safe position and for unlocking the actuator when the locking member is moved to its armed position, biasing means in the body for biasing the locking member toward its safe position, means in the body affording a detonator opening, an electrically operable detonator received and retained in the detonator opening, electrical input means on the nozzle for receiving an electrical signal to cause detonation of the detonator, an electrical switch in the body and having an operating connection to the actuator for electrically disconnecting the electrical input means from the detonator when the actuator is in its safe position and for electrically connecting the electrical input means to the detonator when the actuator is in its armed position, means affording an exit opening from the detonator opening, the igniter including explosion-transmitting means connected between the exit opening and the igniter, the igniter having pyrotechnic means for converting detonation of the explosion-transmitting means into combustion of the igniter charge, and a gate connected to the actuator and movable in the body between safe and armed positions corresponding with the safe and armed positions of the actuator, the gate being operative in its safe position to block the exit opening for preventing transmission of explosive energy from the detonator to the explosion-transmitting means, the gate being operative in its armed position to unblock the exit opening for transmitting explosive energy from the detonator to the explosion-transmitting means.

Preferably, the actuator comprises an actuator slider having a manually operable, externally accessible portion.

The locking member preferably comprises a locking slider having a manually operable, externally accessible portion, the locking slider being movable in a direction transverse to the direction of movement of the actuator slider, the locking slider having means for engaging and locking the actuator slider when it is in its safe position.

Preferably, the ignition safety device includes detent means for releasably detaining the actuator in its armed position, and additional detent means for releasably detaining the actuator in its safe position.

The ignition safety device preferably includes a rockable lever connected to the actuator for manually moving the actuator between its safe and armed positions.

The electrical switch preferably comprises first contact means for electrically short-circuiting the detonator when the actuator is in its safe position, the actuator being operative to disable the first contact means when the actuator is moved to its armed position, the switch comprising second contact means operable by the actuator for establishing an operative electrical circuit between the electrical input means and the detonator when the actuator is moved to its armed position.

More specifically, the switch preferably includes a fixed contact and a first movable spring contact connected to the electrically operable detonator, the first movable spring contact having spring means for causing engagement of the first movable spring contact with the fixed contact when the actuator is in its safe position whereby the detonator is short-circuited, the switch including a second movable spring contact connected electrically to the electrical input means and having spring means for biasing the second movable spring contact away from the first movable spring contact when the actuator is in its safe position, the second movable spring contact being operable by movement of the actuator to its armed position for causing engagement between the first and second movable spring contacts and then causing disengagement of the first movable spring contact from the fixed contact whereby the detonator is no longer short-circuited and an operative electrical circuit is established between the electrical input means and the detonator.

More specifically, the invention preferably provides an ignitions safety device for a rocket motor nozzle having a body with a longitudinal nozzle opening therein, comprising an igniter mounted in the nozzle opening and having a pyrotechnic igniter charge, housing means in the body and forming a detonator opening, an electrically operable detonator mounted in the detonator opening, a manually operable actuator movable in the body between safe and armed positions, the actuator having a portion accessible from outside the body, a locking member movable in the body between safe and armed positions and having an accessible portion extending outside the body, biasing means in the body for biasing the locking member toward its safe position, the locking member having means operative in the safe position thereof for locking the actuator in its safe position and for unlocking the actuator when the locking member is in its armed position, the nozzle having electrical input means for receiving an electrical ignition signal, an electrical switch connected between the electrical input means and the detonator and operable between safe and armed positions, the actuator having connecting means for causing operation of the switch to its safe position when the actuator is in its safe position while causing operation of the switch to its armed position when the actuator is in its armed position, the switch including means operative in the safe position of the switch for disconnecting the electrical input means from the electrically operable detonator and operative in the armed position of the switch for electrically connecting the electrical input means to the detonator, and a gate movable in the housing means and having means connected between the gate and the actuator for moving the gate between safe and armed positions corresponding with the safe and armed positions of the actuator, the gate having means operative in the safe position of the gate for blocking the exit opening to prevent transmission of explosive energy between the detonator and the exit opening, the gate being operative in the armed position thereof for unblocking the exit opening to provide for transmission of explosive energy from the detonator to the exit opening, the igniter including an explosion-transmitting lead extending from the exit opening to the igniter.

Preferably, the actuator is in the form of an actuator rod slidable in the body and having a portion accessible from outside the body.

The locking member is preferably in the form of a locking rod slidable in the body in a direction transverse to the direction of sliding movement of the actuator rod.

The electrical switch preferably comprises first contact means for short-circuiting the detonator when the switch is in its safe position, the switch including second contact means operative in the safe position of the switch for disconnecting the electrical input means from the electrically operable detonator while being operative in the armed position of the switch for connecting the electrical input means to the detonator while also operating the first contact means to a position in which the detonator is no longer short-circuited, the actuator including means for operating the first and second contact means.

More specifically, the switch preferably comprises a fixed contact and a first movable spring contact connected to the detonator, the first movable spring contact having spring means for biasing the first movable spring contact into engagement with the fixed contact to short-circuit the detonator, the switch having a second movable spring contact connected electrically to the electrical input means, the second movable spring contact having biasing means for biasing the second movable spring contact away from the first movable spring contact, the actuator having means for moving the second movable spring contact against the first movable spring contact and then causing movement of the first movable spring contact out of engagement with the fixed contact when the actuator is moved to its armed position.

The ignition safety device preferably includes detent means for detaining the actuator in its armed position while permitting manual return movement of the actuator to its safe position, and additional detent means for releasably detaining the actuator in its safe position.

Preferably, the ignition safety device includes a rocker pivotally mounted on the body and connected to the accessible portion of the actuator for moving the actuator between its safe and armed positions.

More generally speaking, the present invention preferably provides an ignition safety device for controlling the detonation of an explosive device, the ignition safety device comprising housing means, a manually operable actuator movable in the housing means between safe and armed positions, a manually operable locking member movable in the housing means between safe and armed positions and having means for locking the actuator in its safe position when the locking member is in its safe position and for unlocking the actuator when the locking member is moved to its armed position, biasing means for biasing the locking member toward its safe position, means in the housing means affording a detonator opening, an electrically operable detonator received and retained in the detonator opening, electrical input means for receiving an electrical signal to cause detonation of the detonator, electrical switching means in the housing means and having an operating connection to the actuator for electrically disconnecting the electrical input means from the detonator when the actuator is in its safe position and for electrically connecting the electrical input means to the detonator when the actuator is in its armed position, means affording an exit opening for receiving explosive energy from the detonator, a gate connected to the actuator and movable in the housing means between safe and armed positions, the gate being operative in its safe position to block the exit opening to prevent transmission of explosive energy into the exit opening, the gate being operative to unblock the exit opening when the gate is in its armed position whereby any explosive energy from the detonator will be transmitted to the exit opening.

The electrical switching means preferably comprise a fixed contact, a first movable contact for selectively engaging the fixed contact, a first contact spring supporting the first movable contact and initially biasing the first movable contact into engagement with the fixed contact, circuit means connecting the fixed contact and the first contact spring to the electrically operable detonator whereby the detonator is initially short-circuited by the fixed contact and the first movable contact in engagement therewith, a second movable contact, a second contact spring supporting the second movable contact and initially biasing the second movable contact to a position spaced from the first contact spring, additional circuit means for connecting the fixed contact and the second contact spring to the electrical input means, and means operable by movement of the actuator to its armed position for causing movement of the second movable contact into engagement with the first contact spring and for causing movement of the first contact spring so as to move the first movable contact out of engagement with the fixed contact, whereby the electrically operable detonator is no longer short-circuited and is electrically connected through the first contact spring and the second movable contact as well as the second contact spring to the electrical input means for receiving any electrical signal therefrom.

In another aspect, the electrical switching means may comprise first contact means for electrically short-circuiting the detonator when the actuator is in its safe position, the actuator being operative to disable the first contact means when the actuator is moved to its armed position, the switching means comprising second contact means operable by the actuator for establishing an operative electrical circuit between the electrical input means and the detonator when the actuator is moved to its armed position, whereby any electrical signal received by the electrical input means is transmitted to the electrically operable detonator.

The gate preferably has a solid portion movable between the detonator opening and the exit opening for blocking the exit opening when the gate is in its safe position, the gate having an open portion movable between the detonator opening and the exit opening when the gate is in its armed position for unblocking the exit opening.

The ignition safety device preferably includes first detent means for releasably detaining the actuator in its safe position, and second detent means for releasably detaining the actuator in its armed position.

The ignition safety device preferably includes a pivotally mounted rockable lever connected to the actuator for moving the actuator in either direction between its safe and armed positions.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENT

As just indicated, the drawings illustrate an ignition safety device 20 mounted on a rocket motor nozzle 22 which is a component of a rocket motor (not shown) for a military rocket, also comprising a warhead (not shown). The rocket motor, the warhead and other features of the military rocket may be of any known or suitable construction. The nozzle 22 is shown somewhat diagrammatically and without various components which are not pertinent to the present invention.

Figure 1:
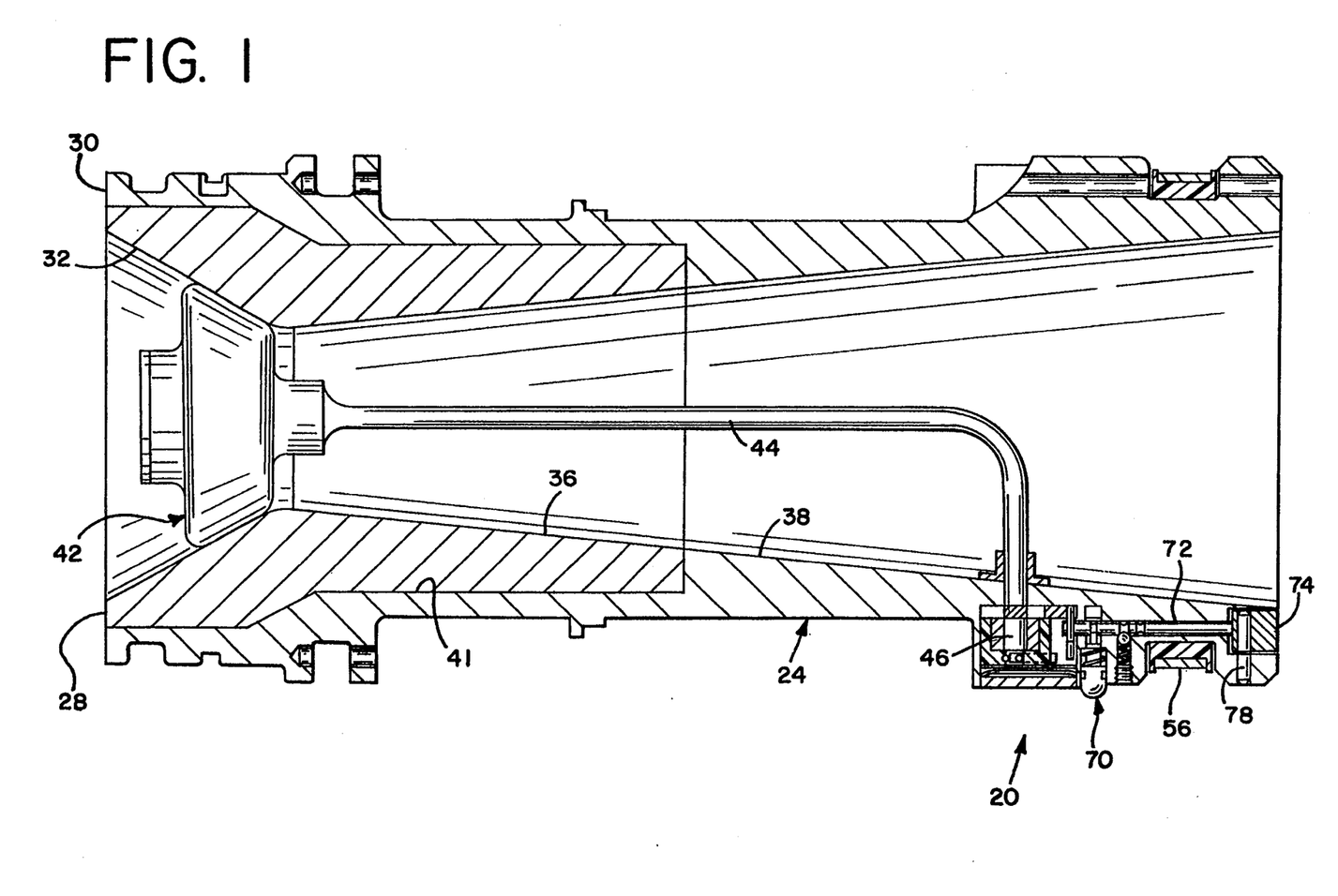
FIG. 1 is a somewhat diagrammatic longitudinal section taken through a rocket motor nozzle and illustrating an ignition safety device to be described as an illustrative embodiment of the present invention.

As illustrated, the nozzle 22 comprises a nozzle body 24, adapted to form the rear component of the rocket motor (not otherwise shown). The nozzle body 24 is elongated and generally circular in cross section. An elongated nozzle opening 26 extends longitudinally in the nozzle body 24 along its entire length and is adapted to convey the extremely hot and energetic blast of gases produced by combustion of the rocket propellant in the combustion chamber or motor casing (not shown) of the rocket motor. The nozzle body 24 is preferably made of a lightweight metal, such as aluminum or an alloy thereof, for example, but a heat resistant liner 28 is securely mounted within the nozzle body 24 at its entrance end 30.

The nozzle opening 26, which is circular in cross section throughout its length, comprises an entrance portion 32 which is formed within the liner 28 and which tapers rearwardly to a constricted throat 34, from which a discharge portion 36 of the nozzle opening 26 flares rearwardly within the heat resistant liner. The discharge portion 36 merges with a further discharge portion 38 which flares rearwardly within the nozzle body 24 to its rear end 40.

The liner 28 is made of a highly heat resistant material, such as graphite, an aluminum oxide ceramic material, or any other known or suitable ceramic or other material, capable of withstanding the high temperatures produced by the hot gases discharged through the nozzle opening 26 from the combustion chamber or motor casing (not shown) of the rocket motor. The liner 28 is suitably secured within an opening 41 of circular cross section, formed within the nozzle body 24.

The ignition safety device 20 is adapted to control the initiation of an igniter 42 which pyrotechnically ignites the propellant charge in the combustion chamber or motor casing (not shown) of the rocket motor. As shown, the igniter 42 is adhesively or otherwise secured in the tapering entrance portion 32 of the nozzle opening 26. The ignition safety device 20 is connected to the igniter 42 by a explosion-transmitting lead or line 44 which extends within the discharge portion 36 and the further discharge portion 38 of the nozzle opening 26. Preferably, the igniter 42 and the explosion-transmitting lead 44 are entirely consumed by the combustion thereof which is initiated by the ignition safety device 20 in response to an electrical signal received from fire control apparatus (not shown) associated with the rocket launcher (not shown). The ignition safety device 20 comprises an electrically operable detonator or squib 46 adapted to ignite the explosion-transmitting lead 44 which in turn precipitates the combustion of the igniter 42. The ignition safety device 20 prevents any premature or unwanted combustion of the igniter 42, by static electricity, a radar beam or otherwise.

The principal components of the ignition safety device 20 are mounted in or on the nozzle body 24, near the rear or discharge end 40 thereof. As shown to best advantage in the enlarged views of FIGS. 2 and 3, the nozzle body 24 is formed with an opening or cavity 48 in which the detonator 46 and other components of the ignition safety device 20 are mounted. The ignition safety device 20 is shown in its safe position in FIG. 2 and in its armed position in FIG. 3. The ignition safety device 20 comprises a housing or block 50 which is received and retained in the opening 48 and is preferably made of a resinous plastic or some other suitable electrically insulating material. The housing 50 is formed with a generally cylindrical opening or cavity 52 in which a cylindrical ring or sleeve 54 is snugly received. The generally cylindrical detonator 46 is firmly mounted within the cylindrical sleeve 54.

Figures 12, 13, 14, 15:
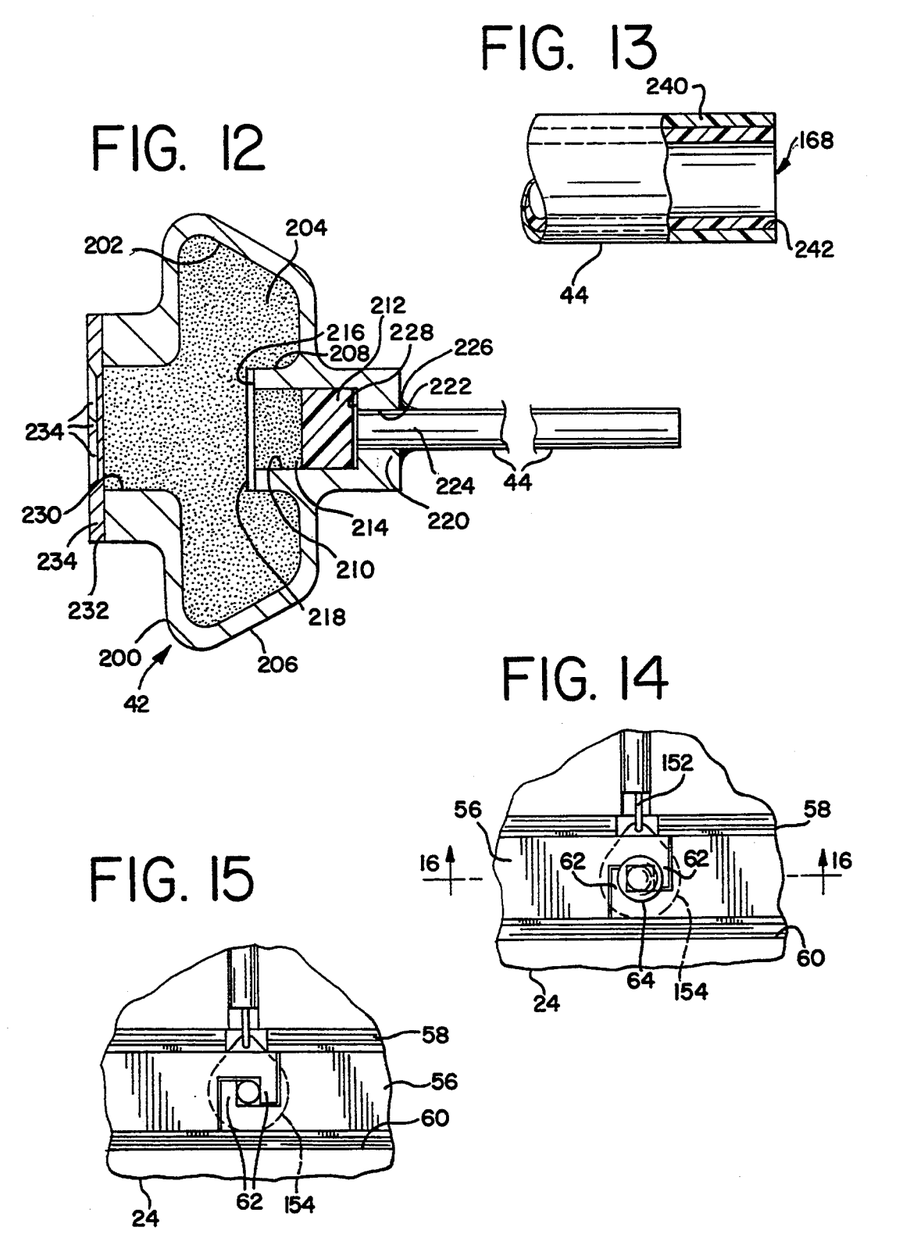
FIG. 12 is a somewhat diagrammatic enlarged longitudinal sectional view taken through the igniter for the ignition safety device.
FIG. 13 is a fragmentary, greatly enlarged, somewhat diagrammatic elevational section showing the explosion-transmitting lead or line which is connected between the ignition safety device and the igniter.
FIG. 14 is a greatly enlarged fragmentary diagrammatic elevational view showing the joint construction of the electrical contact band for the ignition safety device, the view being taken generally as indicated by the line 14—14 in FIG. 17.
FIG. 15 is a view similar to FIG. 14, but with the special retaining pin removed.
Figure 16:
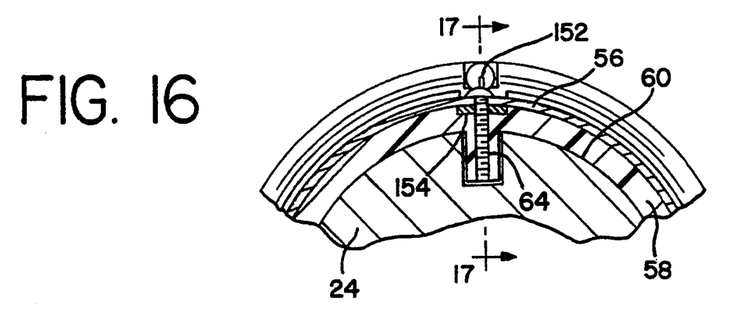
FIG. 16 is a fragmentary sectional view, taken generally along the line 16—16 in FIG. 14.
Figures 17, 18, 19:
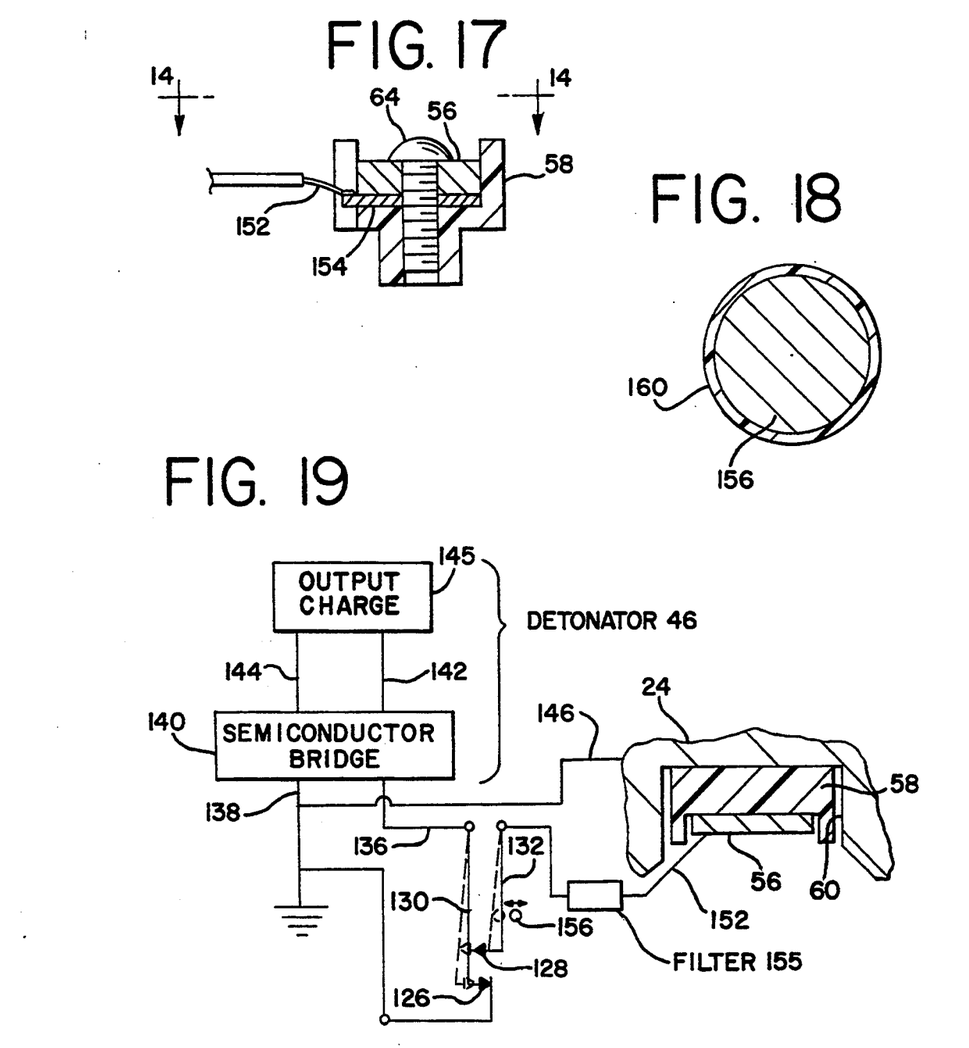
FIG. 17 is a fragmentary diagrammatic sectional view, taken generally along the line 17—17 in FIG. 16.
FIG. 18 is a greatly enlarged cross-sectional view taken through the switch-operating pin on the actuator for the ignition safety device.
FIG. 19 is a schematic electrical circuit diagram for the ignition safety device.

As previously indicated, the detonator 46 is adapted to be triggered or fired by an electrical signal or pulse, received from a control apparatus (not shown) associated with the rocket launcher (not shown). To receive the electrical signal, the nozzle body 24 is provided with an electrical contact band 56 extending around the outside of an electrically insulating ring 58 which is received in a circumferential groove or channel 60, formed in the nozzle body 24 near its rear end 40. The insulating ring 58 is preferably made of a resinous plastic material and may be formed as a plurality of arcuate segments which can be easily inserted into the circumferential groove 60. The contact band 56 is made of metal or some other electrically conductive material and is preferably formed in one piece with a pair of interlocking L-shaped end portions 62 which are secured to the insulating ring 58 by a headed fastener, shown as a drive pin or screw 64 (FIGS. 15–17). Other means may be provided to secure the contact band 56 in place. The electrical firing signal or pulse may be supplied to the contact band 56 by one or more brushes or other contactors (not shown) on the rocket launcher (not shown).

The ignition safety device 20 comprises a manually operable control mechanism or means 66 for selectively arming and disarming the detonator 46. The mechanism 66 has a safe or disarmed position, shown in FIG. 2, and an armed position, shown in FIG. 3. The control mechanism 66 comprises first and second manually operable controls 68 and 70 which must be operated simultaneously in order to arm the detonator 46 of the ignition safety device 20. The first manually operable control 68 is illustrated as comprising a slidable actuator 72 connected to and operable by a manually movable rocker 74 which is swingable in a recess 76 formed in the rear end 40 of the nozzle body 24 and is pivotally supported by a pin 78 mounted in the body 24, as shown in FIGS. 2–5. The actuator 72 is connected to the rocker by a pin 80 which extends through an opening 82 in the actuator 72 and is received in a slot 84, formed in the rocker 74.

Figure 2:
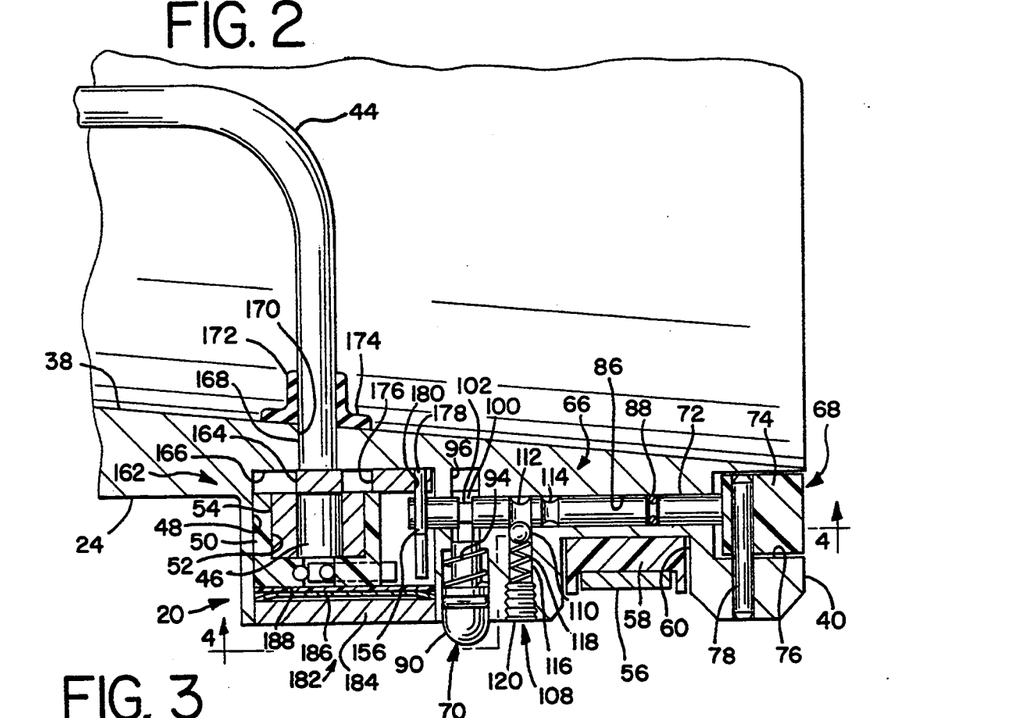
FIG. 2 is a fragmentary enlarged longitudinal section, similar to a portion of FIG. 1, and showing the ignition safety device in its safe position.
Figure 3:
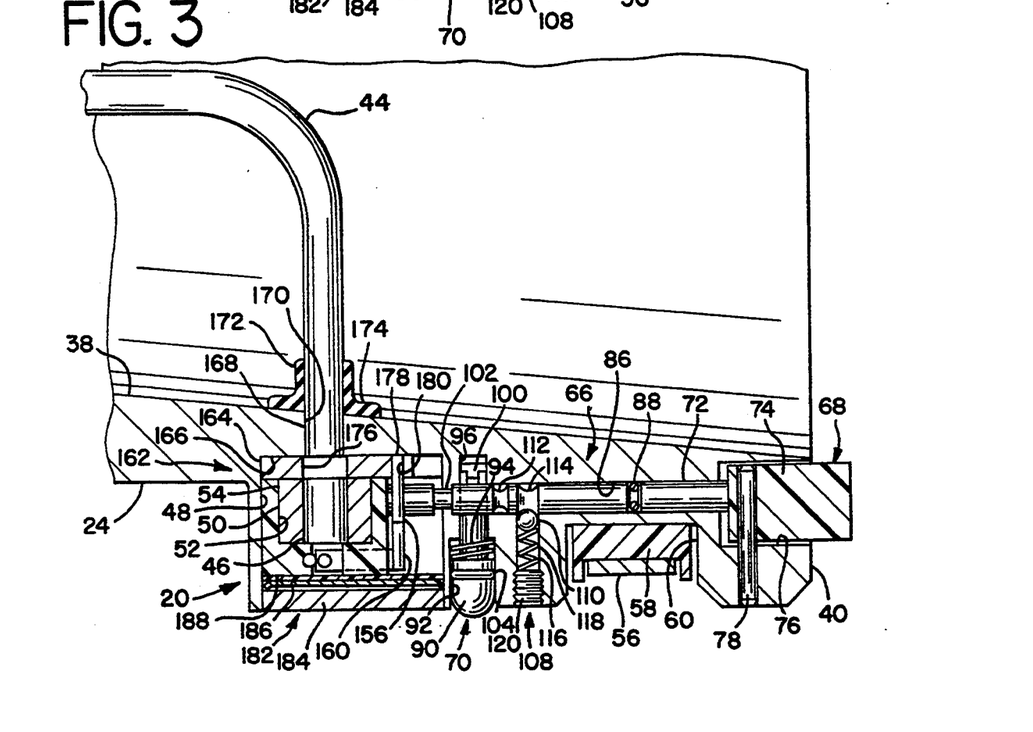
FIG. 3 is a fragmentary enlarged longitudinal section similar to FIG. 2, but showing the ignition safety device in its armed position.
Figure 4:
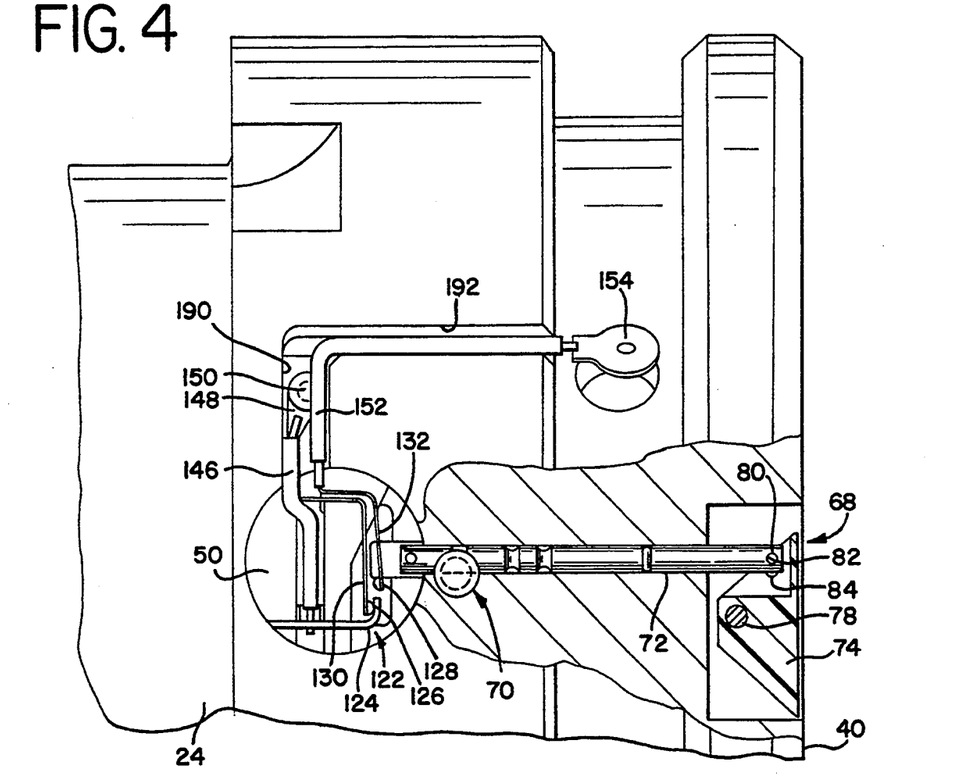
FIG. 4 is a fragmentary enlarged diagrammatic elevational section, taken generally along the line 4—4 in FIG. 2 and showing the ignition safety device in its safe position.

As shown in FIGS. 2 and 3, the illustrated actuator 72 is in the form of an elongated generally cylindrical shaft or rod which is slidable longitudinally in a circular bore or opening 86 formed in the nozzle body 24. A conductive O-ring 88 is employed as a seal between the actuator 72 and the bore 86 and is received in a circumferential groove 89 (FIG. 6) formed in the actuator 72. Initially, the actuator 72 is in its safe position, as shown in FIG. 2, in which the actuator 72 is moved fully toward the rear end 40 of the nozzle body 24, or to the right as shown in FIGS. 2 and 4. The actuator 72 is initially locked in this position by the second manually operable control 70, which thus constitutes a locking member or means.

The illustrated locking member 70 comprises an outer portion in the form of a plunger or push button 90 which is movably received in a bore or opening 92 extending transversely to the longitudinal direction of the bore 86 in which the actuator 72 is slidable. The plunger 90 is biased outwardly to its locking position, as shown in FIG. 2, by resilient means in the form of a compression coil spring 94 which is compressed in the bore 92 behind the plunger 90, whereby the locking member 70 is biased outwardly as shown in FIG. 2.

As shown in FIGS. 2 and 3, the bore 92 has a reduced inner portion 96 in which a reduced inner portion 98 of the locking member 70 is slidable. The locking member 70 is shown separately on an enlarged scale in FIGS. 8 and 9. The extreme inner end of the locking member 70 is formed with an outwardly projecting locking lug 100 which is adapted to interlock with a circumferential groove or channel 102 formed in the actuator 72, when the actuator 72 and the locking member 70 are in their safe or disarmed positions, as shown in FIGS. 2 and 4. As long as the locking member 70 is in its outwardly biased position, as shown in FIG. 2, the actuator 72 cannot be moved inwardly from its safe position. A second O-ring 104 is employed as a seal between the plunger 90 and the bore 92 and is received in a circumferential groove 105 (FIG. 8) formed in the plunger 90.

Figure 5:
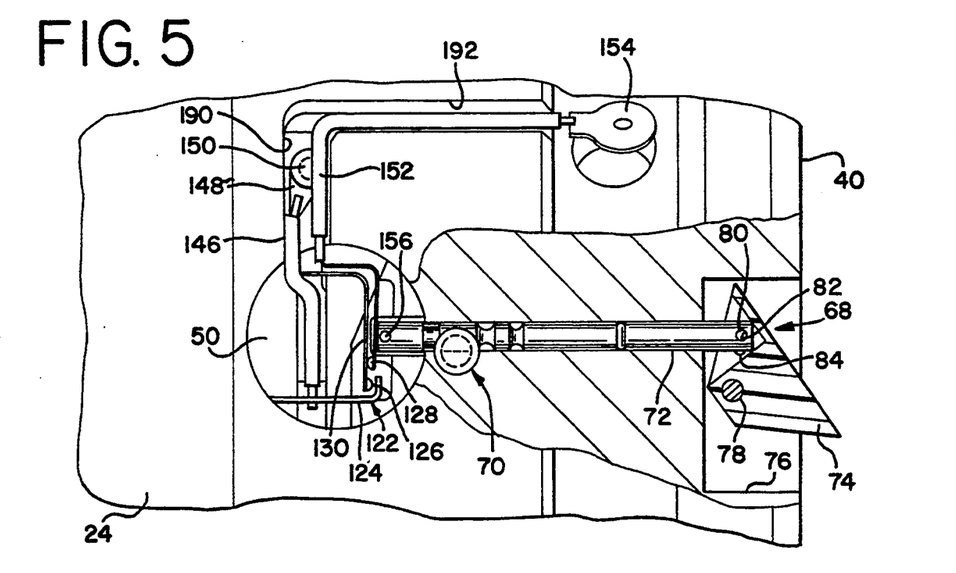
FIG. 5 is a view similar to a portion of FIG. 4, but showing the ignition safety device in its armed position.

When the plunger 90 of the locking member 70 is pushed inwardly, as shown in FIG. 3, the locking lug 100 is moved inwardly out of the circumferential groove 102 in the actuator 72, so that the actuator 72 can be moved to its armed position, as shown in FIGS. 3 and 5, by pushing the rocker 74 counterclockwise to the position shown in FIG. 5. In this position, the rocker 74 projects rearwardly beyond the rear end 40 of the nozzle body 24, so that the rocker 74 will be pushed back to its safe position if the rear end 40 is dropped or placed against a supporting surface.

Figure 8:
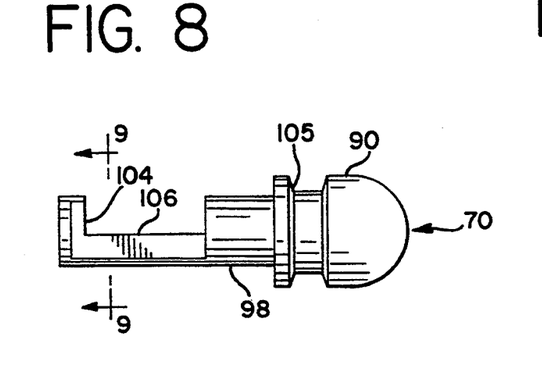
FIG. 8 is an enlarged elevational view of the locking member for the ignition safety device.
Figure 9:
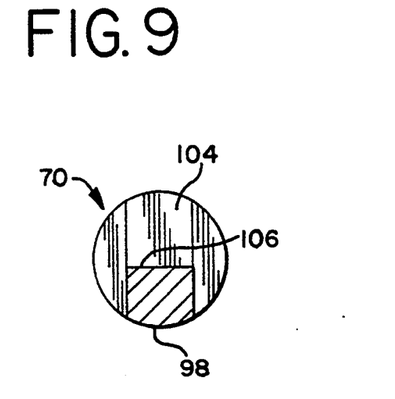
FIG. 9 is a sectional view, taken generally along the line 9—9 in FIG. 8.

As shown to best advantage in FIG. 8, the reduced inner portion 98 of the locking member 70 is formed with a notch or recess 106 which afford clearance for the actuator 72 when the locking member 70 is pushed inwardly to its unlocking position, as shown in FIG. 3. The locking lug 100 projects outwardly or to the right as shown in FIG. 8 at the left hand end of the notch 106.

Detent means 108 are provided for detaining the actuator 72 in both its safe position of FIGS. 2 and 4 and its armed position of FIGS. 3 and 5. Such detent means 108 are shown as comprising a resiliently biased detent ball 110 which is engageable with first and second circumferential detent grooves 112 and 114, formed in the actuator 72 in a spaced relation. The detent ball 110 is movably received in a transverse bore 116 formed in the nozzle body 24. The detent ball 110 is resiliently biased toward the actuator 72 by a coil spring 118 which is compressed in the bore 116 between the detent ball 110 and a screw plug 120 which closes the outer end of the bore 116. The detaining action of the detent ball 110 is sufficiently strong to prevent accidental movement of the actuator 72, or movement of the actuator 72 by vibration.

As shown in FIGS. 4 and 5, the ignition safety device 20 comprises electrical switching means 122, operable by the actuator 72, for selectively connecting the electrically operable detonator 46 to the electrical contact band 56. In the safe position of the electrical switching means 122, as shown in FIG. 4, the detonator 46 is electrically short-circuited and is disconnected from the contact band 56. In the armed position of the electrical switching means 122, as shown in FIG. 5, the short circuit is removed from the detonator 46 and the detonator 46 is connected to the contact band 56. The metal nozzle body 24 is employed as the second or return conductor in the energizing electrical circuit for the detonator 46.

As shown in FIGS. 4 and 5, the electrical switching means 122 comprise a fixed electrical contact 124 and a first movable electrical contact 126 which are connected to the electrically operable detonator 46. The switching means 122 also comprise a second movable electrical contact 128 which is connected to the electrical contact band 56. In the safe position of FIG. 4, the first movable contact 126 is resiliently biased into engagement with the fixed contact 124 by a first leaf spring 130 on which the first movable contact 126 is mounted. The second movable electrical contact 128 is mounted on a second flexible resilient leaf spring 132 which effectively biases the second movable contact 128 to the position shown in FIG. 4, in which the contact 128 is spaced away from the first flexible resilient leaf spring 130. The leaf springs 130 and 132 are supported by the housing or block 50 which is made of an electrically insulating material. The block 50 also supports the fixed contact member 124 which is in the form of a generally L-shaped metal bar. The leaf springs 130 and 132 are also shown as generally L-shaped and are preferably made of an electrically conductive spring metal.

Figure 10:
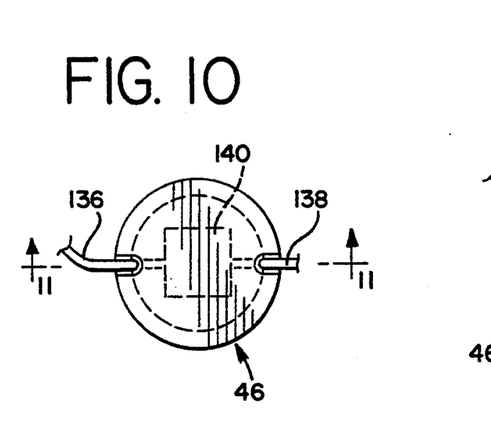
FIG. 10 is a diagrammatic end view of the detonator for the ignition safety device.
Figure 11:
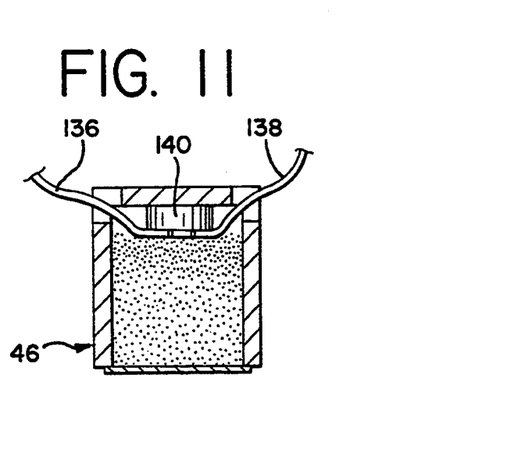
FIG. 11 is a diagrammatic sectional view, taken through the detonator, generally along the line 11—11 in FIG. 10.

In this instance, the electrically operable detonator 46 is connected between the fixed electrical contact 124 and the first conductive leaf spring 130 which carries the first movable electrical contact 126. As illustrated in FIGS. 10, 11 and 19, the electrically operable detonator 46 has first and second electrical leads 136 and 138 connected thereto. As shown most clearly in the schematic circuit diagram of FIG. 19, the lead 136 is connected to the first contact spring 130 on which the first movable contact 126 is mounted. The lead 138 is connected to the fixed contact 124.

As shown in FIG. 19, the detonator 46 incorporates a semiconductor bridge 140 having its input connected to the leads 136 and 138, while the output of the bridge 140 is connected to conductors 142 and 144 extending to an output charge or initiating compound 145. The bridge 140 establishes an electrical threshold so that the electrical signal supplied by the leads 136 and 138 must exceed a predetermined magnitude before an explosion initiating signal will be transmitted by the bridge 140 to the output charge 145.

A lead or wire 146 is also connected between the fixed contact 124 and the nozzle body 24 which is electrically conductive and is employed as the second or return conductor of the input circuit which also includes the contact band 56, whereby the electrical firing signal is transmitted between the rocket launcher and the ignition safety device 20. In FIGS. 4 and 5, the lead 146 is shown as being connected between the fixed contact 124 and a lug 148 which is clamped against the nozzle body 24 by a headed fastener 150. Another lead or wire 152 is connected between the second contact spring 132 (FIGS. 4 and 5) and another lug 154 which is clamped beneath the contact band 56 by the fastener 64, as shown in FIGS. 16 and 17. A filter 155 (FIG. 19) is preferably connected in series with the lead 152 to suppress electromagnetic interference (EMI) and radio frequency interference (RFI) which may be picked up by the contact band 56 which tends to act as an antenna. The filter 155 prevents such EMI or RFI from causing unwanted detonation of the detonator 46.

Figures 6, 7:
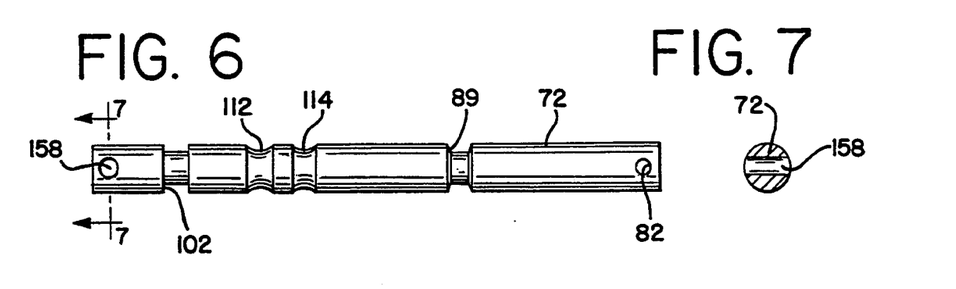
FIG. 6 is an enlarged elevational view of the actuator for the ignition safety device.
FIG. 7 is a cross-sectional view, taken generally along the line 7—7 in FIG. 6.

Means are provided whereby the actuator 72 is effective to operate the switching means 122 between its disarmed condition of FIG. 4 and its armed condition of FIG. 5 when the actuator 72 is moved to the left between its safe and armed positions of FIGS. 4 and 5. Such switch-operating means are shown as comprising a transverse pin 156 securely carried by the actuator 72 and extending through a transverse bore or opening 158 extending through the actuator 72 near its left hand end, as shown in FIG. 6.

In the safe or disarmed position of the actuator 72, as shown in FIGS. 2 and 4, the switch-operating pin 156 is spaced away from the second contact spring 132, so that the second movable contact 128 is kept out of engagement with the first contact spring 130. When the actuator 72 is moved to the left to its armed position, as shown in FIGS. 3 and 5, the pin 156 engages the second contact spring 132 and pushes it to the left, whereby the second movable contact 128 engages the first contact spring 130 and flexes it to the left so that the first movable contact 126 is disengaged from the fixed contact 124. The engagement of the second movable contact 128 with the first contact spring 130 establishes an electrical circuit between the contact band 56 and the first electrical lead 136 of the detonator 46, as will be evident from the circuit diagram of FIG. 16. The disengagement of the first movable contact 126 from the fixed contact 124 removes the short circuit between the detonator leads 136 and 138, so that the detonator 46 can be triggered by an electrical signal of sufficient magnitude, supplied to the electrical circuit between the contact band 56 and the nozzle body 24.

As shown to best advantage in the greatly enlarged cross sectional view of FIG. 18, the portion of the switch-operating pin 156 which engages the second contact spring 132 is electrically insulated by an insulating sleeve or tube 160 which is shrunk or otherwise mounted around the pin 156. The insulating sleeve 160 may be made of a shrinkable resinous plastic material or any other suitable insulating material. The insulating sleeve 160 prevents the pin 156 from establishing an electrical connection between the second contact spring 132 and the nozzle body 24, within which the actuator 72 is slidable.

To provide additional safety against premature or unwanted detonation of the igniter 42, the control means 66 of the ignition safety device 20 also comprise blast-blocking means 162 for controlling the propagation of the blast of the detonator 46 to the explosion-transmitting lead 44. As shown in FIGS. 2 and 3, the blast-blocking means 162 comprise a movable gate or valve 164 which is preferably slidable in a channel 166 formed in the nozzle body 24 between the detonator 46 and the explosion-transmitting lead 44, which has an entrance end portion 168 securely received in a bore or opening 170 in the nozzle body 24. As shown, a sealing ring 172 is securely mounted around the lead 44 and is formed with a flange 174 which preferably is adhesively secured to the inner surface of the nozzle body 24 along the portion 38 of the nozzle opening 26 therein. The sealing ring 172 may also be adhesively secured to the explosion-transmitting line 44.

FIG. 2 shows the slidable gate 164 in its safe position, in which it completely blocks or closes the entrance end 168 of the explosion-transmitting lead 44, so that the blast of the detonator 46 can not be propagated to the lead 44. The gate 164 is made of a metal material which is capable of withstanding the heat and the explosive blast generated by the detonator 46 when it is triggered.

When the actuator 72 is moved to its armed position, as shown in FIG. 3, the slide gate 164 is moved to the left along the channel 166 so that an opening 176 in the gate 164 is aligned with the detonator 46 and the entrance end 168 of the explosion-transmitting lead 44.

An operating connection is provided between the actuator 72 and the slide gate 164 by an end portion 178 of the pin 156 which is carried by the actuator 72. The end portion 178 is received in a bore or opening 180, formed in the slide gate 164.

The blast-blocking means 162 afford an extra measure of safety, in that the slide gate 164 blocks any communication of explosive energy between the detonator 46 and the explosion-transmitting lead 44 when the actuator 72 is in its safe position, as shown in FIG. 2. Even if the detonator 46 is ignited by some unlikely event, the slide gate 164 prevents any propagation of explosive energy from the detonator 46 to the explosion-transmitting lead 44, so that the igniter 42 will not be detonated.

The ignition safety device 20 comprises retaining means 182 for firmly and securely retaining the insulating housing or block 50 in the opening 48 formed in the nozzle body 24. As shown to best advantage in FIGS. 2 and 3, such retaining means 182 comprise a retaining disc or plug 184 which is press fitted or otherwise securely fixed in the outer end of the opening 48. In addition to being press fitted, the disc 184 may be staked and/or adhesively secured in the opening 48. A spring disc 186 and an insulating disc 188 are interposed between the plug disc 184 and the housing 50. The spring disc 186 is firmly compressed by the plug disc 184 so that the spring disc 186 exerts a steady resilient force on the insulating disc 188 whereby it firmly presses the housing 50 into the opening 48. The insulating disc 188 affords electrical insulation between the metal spring disc 186 and the various electrically conductive components of the electrical switching means 122. Such components include the contacts 124, 126 and 128 and the leaf springs 130 and 132.

As shown in FIGS. 4 and 5, the electrical leads 146 and 152 are in the form of insulated electrical wires which are recessed into grooves or channels 190 and 192, formed in the outside of the nozzle body 24. The channels 190 and 192 are preferably closed by one or more electrically conductive metal plates or other members, not shown, press fitted into the channels 190 and 192 or otherwise retained therein, to provide electrical and mechanical shielding for the leads 146 and 152.

The igniter 42 comprises a fully combustible case 200, made of a highly combustible plastic or plastic-like material, preferably a castable plastic-like material known by the trade name Pyrostruct which is composed primarily of a mixture of potassium perchlorate, epoxy resin and carbon fiber. The case 200 is formed with a main internal cavity 202, filled with a main explosive charge 204, preferably comprising MTV pyrotechnic material, Type I, in the form of a mixture of granules and pellets. The letters MTV are an abbreviation for MAGNESIUM TEFLON VITON. The magnesium constituent of the MTV is in the form of fine particles or powder. Teflon is a well-known resinous plastic material. Viton is a rubbery co-polymer which is adapted to act as a binder. The MTV granules and pellets are prepared in such a manner that each magnesium particle is completely surrounded by a coating of binder material.

The case 200 has a tapering frustoconical side wall 206 which is adapted to fit snugly in the tapering entrance portion 32 of the nozzle opening 26. A suitable adhesive may be employed to secure the frustoconical side wall 206 to the entrance portion 32 of the nozzle opening 26.

The hollow case 200 is formed with a small axially disposed inner cup 208 having a small generally cylindrical cavity 210 therein. A generally cylindrical explosive pellet 212 and a small pyrotechnic pellet charge 214 are received in the cavity 210. The explosive pellet 212 may be molded from a plastic explosive material such as A-S or another compound containing RDX. The small pyrotechnic charge 214 may comprise MTV explosive material, Type II, in the form of granules.

A flat annular lip 216 is formed around the mouth of the cup 208. The mouth of the cup 208 is closed by a thin flat sealing disc 218 secured to the lip 216 by a suitable adhesive, preferably a pressure sensitive adhesive applied to the disc 218, which may be made of teflon film or some other suitable resinous plastic material.

The cup 208 is formed with a rear wall 220 having an axial bore or opening 222 therein for receiving the terminal end 224 of the explosion-transmitting lead or line 44. The terminal end 224 is adhesively secured and sealed in the opening 222. As shown, a circumferential ring 226 of an adhesive sealant is applied between the lead 44 and the case 200 at the joint therebetween.

A sealing disc 228 is adhesively secured to the rear wall 220 at the rear end of the cavity 210, to provide a seal between the cavity 210 and the opening 222 in which the terminal end 224 of the lead 44 is mounted.

The sealing discs 218 and 228 exclude moisture from the small cavity 210. The sealing disc 228 may be made of teflon film or some other suitable material. Pressure sensitive adhesive or some other suitable adhesive is employed between the sealing disc 228 and the rear wall 220. The sealing discs 218 and 228 may be quite thin, such as about 5/1000 of an inch (0.127 mm).

The main cavity 202 in the case 200 has an axial mouth or opening 230. A flat annular lip 232 extends around the mouth 230. A sealing lid or disc 234 is adhesively secured to the flat annular lip 232, to close the cavity 202 and to exclude moisture therefrom. The sealing lid 234 is made of a plastic or plastic-like material and preferably is made of a combustible material which is the same as or similar to the material of which the case 200 is made. Thus, the sealing lid or disc 234 is preferably made of a modified Pyrostruct castable plastic-like material composed primarily of a mixture of potassium perchlorate and an epoxy resin, but without the carbon fiber used in the material of the case 200, so that the sealing lid 234 is fully combustible. Indentations 236 in a star-shaped or other suitable pattern are formed in the outer side of the sealing lid 234 so that it is easily ruptured when the main explosive charge 204 is detonated or ignited.

As shown in FIG. 13, the explosion-transmitting lead or line 44 comprises a flexible or semi-rigid resinous plastic tube 240 made of a heat-shrinkable plastic material, such as nonel or kynar, into which a tubular layer of a plastic explosive material 242 has been extruded or applied as an interior coating. A suitable plastic explosive material is PBXN-301, also known as "EXTEX" which is well known to those skilled in the art.

When the detonator 46 is electrically triggered by the semiconductor bridge 140, the shock wave resulting from the detonation of the detonator propagates through the opening 176 in the slide gate 164 and into the entrance end portion 168 of the explosion-transmitting lead 44, whereby the shock wave from the explosion detonates the explosive material 242, so that it detonates and transmits a detonation at a very high velocity along the lead 44 to the igniter 42.

The explosive energy transmitted to the igniter 42 by the lead 44 causes successive initiation of the explosive pellet 212, the small pyrotechnic charge 214 and the main igniter pyrotechnic charge 204. The combustion products of the main charge 204 ignite the propellant charge in the rocket motor. The sealing discs 228, 218 and 234 are disintegrated and completely consumed by the successive reactions in the lead 44 and the igniter 42.

The explosion transmitted by the lead 44 causes complete combustion of the lead 44, including both the explosive material 242 and the plastic supporting tube 240. The successive reactions in the igniter 42 cause rapid and complete combustion of the case or shell 200, due to its highly combustible composition. The rapid and complete combustion of the entire igniter 42 and the entire lead 44 obviates the presence of any substantial solid fragments in the blast of hot gases traveling through and discharged from the axial opening 26 in the nozzle body 24.

If the nozzle 22 is subjected to excessive heat, supplied to the nozzle 22 at a slow rate as by a fire, for example, the explosive materials in the igniter 42, the lead 44 and the detonator or squib 46, will ultimately catch fire and burn, without any detonation or explosion of the explosive materials, prior to auto-ignition of the propellant charge in the rocket motor. Thus, unwanted detonation or explosion of the rocket is obviated.

Inasmuch as all of the explosive materials in the ignition safety device 20, the nozzle 22 and the rocket motor (not shown), when all present together in a complete rocket motor unit, will burn rather than exploding when subjected to a slow heat, these components qualify as insensitive munitions under the specifications and standards promulgated by the United States Navy.

Various modifications, alternative constructions and equivalents may be employed without departing from the true spirit and scope of the present invention, as described herein and as defined in the following claims.

We claim:

1. An ignition safety device for a rocket motor nozzle having a body with a longitudinal nozzle opening therein, comprising an igniter mounted in said nozzle opening and having a pyrotechnic igniter charge, housing means in said body and forming a detonator opening, an electrically operable detonator mounted in said detonator opening, a manually operable actuator movable in said body between safe and armed positions, said actuator having a portion accessible from outside said body, a locking member movable in said body between safe and armed positions and having an accessible portion extending outside said body, biasing means in said body for biasing said locking member toward its safe position, said locking member having means operative in said safe position thereof for locking said actuator in its safe position and for unlocking said actuator when said locking member is in its armed position, said nozzle having electrical input means for receiving an electrical ignition signal, an electrical switch connected between said electrical input means and said detonator and operable between safe and armed positions, said actuator having connecting means for causing operation of said switch to its safe position when said actuator is in its safe position while causing operation of said switch to its armed position when said actuator is in its armed position, said switch including means operative in the safe position of said switch for disconnecting said electrical input means from said electrically operable detonator and operative in the armed position of said switch for electrically connecting said electrical input means to said detonator, means affording an exit opening from said detonator opening, and a gate movable in said housing means and having means connected between said gate and said actuator for moving said gate between safe and armed positions corresponding with the safe and armed positions of said actuator, said gate having means operative in the safe position of said gate for blocking said exit opening to prevent transmission of explosive energy between said detonator and said exit opening, said gate being operative in the armed position thereof for unblocking said exit opening to provide for transmission of explosive energy from said detonator to said exit opening, said igniter including an explosion-transmitting lead extending from said exit opening to said igniter.

2. An ignition safety device according to claim 1, in which said actuator is in the form of an actuator rod slidable in said body and having a portion accessible from outside said body.

3. An ignition safety device according to claim 2, in which said locking member is in the form of a locking rod slidable in said body in a direction transverse to the direction of sliding movement of said actuator rod.

4. An ignition safety device according to claim 1, in which said electrical switch comprises first contact means for short-circuiting said detonator when said switch is in its safe position,
said switch including second contact means operative in the safe position of said switch for disconnecting said electrical input means from said electrically operable detonator while being operative in said armed position of said switch for connecting said electrical input means to said detonator while also operating said first contact means to a position in which said detonator is no longer short-circuited,
said actuator including means for operating said first and second contact means.

5. An ignition safety device according to claim 1, in which said switch comprises a fixed contact and a first movable spring contact connected to said detonator,
said first movable spring contact having spring means for biasing said first movable spring contact into engagement with said fixed contact to short-circuit said detonator,
said switch having a second movable spring contact connected electrically to said electrical input means,
said second movable spring contact having biasing means for biasing said second movable spring contact away from said first movable spring contact,
said actuator having means for moving said second movable spring contact against said first movable spring contact and then causing movement of said first movable spring contact out of engagement with said fixed contact when said actuator is moved to its armed position.

6. An ignition safety device according to claim 1, including detent means for detaining said actuator in its armed position while permitting manual return movement of said actuator to its safe position,
and additional detent means for releasably detaining said actuator in its safe position.

7. An ignition safety device according to claim 1, including a rocker pivotally mounted on said body and connected to the accessible portion of said actuator for moving said actuator between its safe and armed positions.

8. An ignition safety device for a rocket motor nozzle having a body with a longitudinal nozzle opening therein, comprising
an igniter mounted in said nozzle opening and having a pyrotechnic igniter charge,
a manually operable actuator movable in said body between safe and armed positions,
a manually operable locking member movable in said body between safe and armed positions and having means for locking said actuator in its safe position when said locking member is in its safe position and for unlocking said actuator when said locking member is moved to its armed position,
biasing means in said body for biasing said locking member toward its safe position,
means in said body affording a detonator opening,
an electrically operable detonator received and retained in said detonator opening,
electrical input means on said nozzle for receiving an electrical signal to cause detonation of said detonator,
an electrical switch in said body and having an operating connection to said actuator for electrically disconnecting said electrical input means from said detonator when said actuator is in its safe position and for electrically connecting said electrical input means to said detonator when said actuator is in its armed position,
means affording an exit opening from said detonator opening,
said igniter including explosion-transmitting means connected between said exit opening and said igniter,
said igniter having pyrotechnic means for converting detonation of said explosion-transmitting means into combustion of said igniter charge,
and a gate connected to said actuator and movable in said body between safe and armed positions corresponding with said safe and armed positions of said actuator,
said gate being operative in its safe position to block said exit opening for preventing transmission of explosive energy from said detonator to said explosion-transmitting means,
said gate being operative in its armed position to unblock said exit opening for transmitting explosive energy from said detonator to said explosion-transmitting means.

9. An ignition safety device according to claim 8, in which said actuator comprises an actuator slider having a manually operable, externally accessible portion.

10. An ignition safety device according to claim 9, in which said locking member comprises a locking slider having a manually operable, externally accessible portion,
said locking slider being movable in a direction transverse to the direction of movement of said actuator slider,
said locking slider having means for engaging and locking said actuator slider when it is in its safe position.

11. An ignition safety device according to claim 8, including detent means for releasably detaining said actuator in its armed position,
and additional detent means for releasably detaining said actuator in its safe position.

12. An ignition safety device according to claim 8, including a rockable lever connected to said actuator for manually moving said actuator between its safe and armed positions.

13. An ignition safety device according to claim 8, in which said electrical switch comprises first contact means for electrically short-circuiting said detonator when said actuator is in its safe position,
said actuator being operative to disable said first contact means when said actuator is moved to its armed position, said switch comprising second contact means operable by said actuator for establishing an operative electrical circuit between said electrical input means and said detonator when said actuator is moved to its armed position.

14. An ignition safety device according to claim 8,
in which said electrical switch includes a fixed contact and a first movable spring contact connected to said electrically operable detonator,
said first movable spring contact having spring means for causing engagement of said first movable spring contact with said fixed contact when said actuator is in its safe position whereby said detonator is short-circuited,
said switch including a second movable spring contact connected electrically to said electrical input means and having spring means for biasing said second movable spring contact away from said first movable spring contact when said actuator is in its safe position,
said second movable spring contact being operable by movement of said actuator to its armed position for causing engagement between said first and second movable spring contacts and then causing disengagement of said first movable spring contact from said fixed contact whereby the detonator is no longer short-circuited and an operative electrical circuit is established between said electrical input means and said detonator.

15. An ignition safety device for controlling the detonation of an explosive device, said ignition safety device comprising
housing means,
a manually operable actuator movable in said housing means between safe and armed positions,
a manually operable locking member movable in said housing means between safe and armed positions and having means for locking said actuator in its safe position when said locking member is in its safe position and for unlocking said actuator when said locking member is moved to its armed position,
biasing means for biasing said locking member toward its safe position,
means in said housing means affording a detonator opening,
an electrically operable detonator received and retained in said detonator opening,
electrical input means for receiving an electrical signal to cause detonation of said detonator,
electrical switching means in said housing means and having an operating connection to said actuator for electrically disconnecting said electrical input means from said detonator when said actuator is in its safe position and for electrically connecting said electrical input means to said detonator when said actuator is in its armed position,
means affording an exit opening for receiving explosive energy from said detonator,
a gate connected to said actuator and movable in said housing means between safe and armed positions,
said gate being operative in its safe position to block said exit opening to prevent transmission of explosive energy into said exit opening,
said gate being operative to unblock said exit opening when said gate is in its armed position whereby any explosive energy from said detonator will be transmitted to said exit opening.

16. An ignition safety device according to claim 15,
in which the electrical switching means comprise a fixed contact,
a first movable contact for selectively engaging said fixed contact,
a first contact spring supporting said first movable contact and initially biasing said first movable contact into engagement with said fixed contact,
circuit means connecting said fixed contact and said first contact spring to said electrically operable detonator whereby said detonator is initially short-circuited by said fixed contact and said first movable contact in engagement therewith,
a second movable contact,
a second contact spring supporting said second movable contact and initially biasing said second movable contact to a position spaced from said first contact spring,
additional circuit means for connecting said fixed contact and said second contact spring to said electrical input means,
and means operable by movement of said actuator to its armed position for causing movement of said second movable contact into engagement with said first contact spring and for causing movement of said first contact spring so as to move said first movable contact out of engagement with said fixed contact,
whereby said electrically operable detonator is no longer short-circuited and is electrically connected through said first contact spring and said second movable contact as well as said second contact spring to said electrical input means for receiving any electrical signal therefrom.

17. An ignition safety device according to claim 15,
in which said electrical switching means comprise first contact means for electrically short-circuiting said detonator when said actuator is in its safe position,
said actuator being operative to disable said first contact means when said actuator is moved to its armed position,
said switching means comprising second contact means operable by said actuator for establishing an operative electrical circuit between said electrical input means and said detonator when said actuator is moved to its armed position,
whereby any electrical signal received by said electrical input means is transmitted to said electrically operable detonator.

18. An ignition safety device according to claim 15,
in which said gate has a solid portion movable between said detonator opening and said exit opening for blocking said exit opening when said gate is in its safe position,
said gate having an open portion movable between said detonator opening and said exit opening when said gate is in its armed position for unblocking said exit opening.

19. An ignition safety device according to claim 15,
including first detent means for releasably detaining said actuator in its safe position, and second detent means for releasably detaining said actuator in its armed position.

20. An ignition safety device according to claim 15,
including a pivotally mounted rockable lever connected to said actuator for moving said actuator in either direction between its safe and armed positions.

* * * * *